United States Patent [19]

Good

[11] Patent Number: 4,899,985
[45] Date of Patent: Feb. 13, 1990

[54] LOW-PROFILE HYDRAULIC LIFT

[76] Inventor: Dave Good, 1607 Sixth Ave., Grinnell, Iowa 50112

[21] Appl. No.: 231,951

[22] Filed: Aug. 15, 1988

[51] Int. Cl.[4] .............................................. B60P 1/48
[52] U.S. Cl. ................................... 254/8 B; 254/124; 254/134
[58] Field of Search ............... 254/124, 133, 134, 8 R, 254/8 B; 269/17

[56] References Cited

U.S. PATENT DOCUMENTS

| | | | |
|---|---|---|---|
| 3,797,675 | 3/1974 | Moore | 254/8 B |
| 4,118,010 | 10/1978 | Hanscom | 254/134 |
| 4,123,038 | 10/1978 | Meyers | 254/134 |
| 4,669,703 | 6/1987 | Hawkins et al. | 254/8 B |

Primary Examiner—Robert C. Watson
Attorney, Agent, or Firm—Douglas L. Tschida

[57] ABSTRACT

A castered, low-profile, hydraulic lift assembly including a pivoting lift arm supporting a plurality of detachable transition arms and lift heads. Slip couplers, including linch pins and set screws mating with the arms and lift heads, adjustably position the proper head in overlying or underlying relation to the workpiece. The lift heads, which include workpiece securing hooks, support yokes, chains and support harnesses, slip mount to a slotted end of the outermost arm.

12 Claims, 5 Drawing Sheets

LOW-PROFILE HYDRAULIC LIFT

BACKGROUND OF THE INVENTION

The present invention relates to utility lifting assemblies and, in particular, to a low-profile, castered, multi-purpose assembly adaptable to a variety of general and automotive repair applications.

A problem long plaguing automotive and heavy equipment repair and maintenance personnel is how to efficiently handle major equipment subassemblies, such as transmissions, differential gears, axles and the like, where the vehicle weight is sufficiently great to the point where a vehicle hoist is either unable or unavailable to lift the vehicle to comfortable working height. Although repair pits have been used in some of such circumstances, the problem still remains of how to manipulate and manhandle the vehicle subassembly, especially when it weighs hundreds of pounds. When using a pit, one might detach the subassembly and capture it on a lower upright support, prior to manually pushing the vehicle away from the pit to permit removal of the subassembly from beneath the vehicle. Needless to say, such efforts are rather tedious and difficult, especially for vehicles capable of supporting loads in excess of one ton.

Where a pit is unavailable and one is unable to lift the entire vehicle, jacking assemblies can be manipulated beneath the vehicle to raise a portion of it. One may then work beneath the chassis on one's back or in a seated posture on an associated castered dolly or the floor. One's posture and efficiency however suffer when working in this fashion, since this posture must be maintained until the subassembly is removed.

The physical removal of the subassembly again occurs in a sequential process which requires detaching and supporting the subassembly, raising the vehicle away from the subassembly or lowering the subassembly and withdrawing the subassembly. The only advantage in the above removal sequence is that the vehicle need not normally be moved. Otherwise, it is as tedious as using a pit.

Although Applicant is aware of various transmission supports which are usable beneath a raised vehicle and engine lifts or so called "cherry picker" arrangements which find application when removing an engine from above the vehicle without the aid of a vehicle lift, Applicant is not aware of any such assembly which may be selectively assembled to the task at hand and be operated from beneath the vehicle. Nor is Applicant aware of any assembly which permits the alternative grasping and raising the subassembly in the space between the vehicle chassis and subassembly or the space between the floor and subassembly. Although various hydraulic floor jacks might be used in latter circumstance, since they provide an underlying lift force as opposed to an overlying force, this is not always possible, due to minimal ground space clearance between the floor and subassembly.

Applicant is also aware of a variety of early patents which disclose a number of a low-profile lifting devices which variously depend on a mechanical jack mechanism or a hydraulic mechanism. Of the former type, applicant is aware of U.S. Pat. Nos. 4,690,378; 3,749,361; 3,154,206; 3,011,763; and 2,575,160. Specifically, the 3,154,206 and 3,749,361 Pat. Nos. disclose castered jacking assemblies including screw operated lift towers and ratchet lift towers, the later of which include singular replaceable lift heads of differing constructions. The 2,575,160 and 4,690,378 patents disclose a pair of low-profile, castered jacks which operate relative to scissors acting lift mechanisms which may also include replaceable singular lift attachments for grasping the surface to be raised. The 3,011,763 Pat. discloses an elongated hydraulic lift assembly with remotely mounted operating mechanisms.

Applicant is additionally aware of two other hydraulic lift assemblies which are disclosed in U.S. Patent Nos. 4,479,632 and 3,040,908. Of these, the former patent discloses a jacking assembly for accessing a subassembly from above the vehicle. In particular, it discloses an engine hoist wherein a primary, pivotally mounted lift arm is hydraulically raised. Coupled to the forward end of the lift arm are secondary hydraulic lift assemblies for tilting and otherwise adjusting a pivotal fore end of the lift arm. The later patent discloses a low-profile jacking assembly more of the type of the present invention for accessing a subassembly from beneath the raised chassis. It too provides for a pivotally mounted fore end including associated screw means for changing the tilt angle of the work piece grasping end of the assembly.

Although the later assembly is relevant to some circumstances wherein the present invention finds particular advantage, the fore end tilt control assemblies do not accommodate the wide range of circumstances that oftentimes arise when working on a variety of makes and models of vehicles, be it an automobile, truck or motorcycle.

The preference therefore is to have available a low-profile, castered lift assembly which accommodates a variety of detachable, adjustable working heads for appropriately lifting or supporting a subassembly relative to the available clearance space between the vehicle and/or ground. A multiplicity of interlocking heads provides greater freedom and ability to meet the needs of a specific circumstance, rather than the limited range adjustment provided by singular moveable heads having only limited degrees of tilting freedom.

SUMMARY OF THE INVENTION

With the foregoing deficiencies of the art in mind, applicant has accordingly developed an improved low-profile castered hydraulic lift assembly.

It is accordingly a primary object of the present invention to provide for a lifting assembly having a low-profile with a relatively wide and long support base relative to a forward, weight bearing end of an associated pivotally mounted, primary lift arm to permit use of the lift arm beneath the vehicle for either lifting or jacking the subassembly to be maintained/repaired.

It is a further object of the invention to provide for a hydraulically raised primary lift arm.

It is another object of the invention to provide for a primary lift arm which receives a plurality of detachable transition arms and lift heads which may be independently coupled to the lift arm and to one another, and relative to which separate work piece holders may be separately adjusted.

Various of the foregoing objects, advantages and distinctions of the invention are particularly achieved in one preferred embodiment wherein a U-shaped framework is supported from a plurality of casters. Suspended from the framework cross arms are a plurality of upwardly angulating strut members which pivotally support a longitudinally extending primary lift arm. A hydraulic, so called "bottle jack" mounted between a jack support portion of the framework and primary lift arm control lift arm movement.

Mountable to a set screw containing fore end of the primary arm are a plurality of transition lifting/jacking arms which are securable to the primary arm and each other via additionally provided set screw and lynch pin fasteners. The transition arms each include slip coupler heads adaptable to mounting with the other arms. The outermost transition arm typically includes a slotted fore end for adjustably receiving a specific workpiece holder or lift head. Depending upon the application, the lift heads may couple to a subassembly for either lifting from above or jacking from below the assembly, depending upon the available space between the subassembly and chassis or subassembly and floor.

The above objects, advantages and distinctions of the invention, among others, will however become more apparent hereinafter upon reference to the following description of the presently preferred embodiment with respect to the appended drawings. Before referring thereto, it is to be appreciated the following description is made by way of the presently preferred embodiment of the invention which should not be interpreted in limitation of the spirit and scope of the invention as set forth in the claims appended hereto. To the extent modifications or improvements have been considered, they are described as appropriate.

DESCRIPTION OF THE PREFERRED EMBODIMENT

Figure 1:
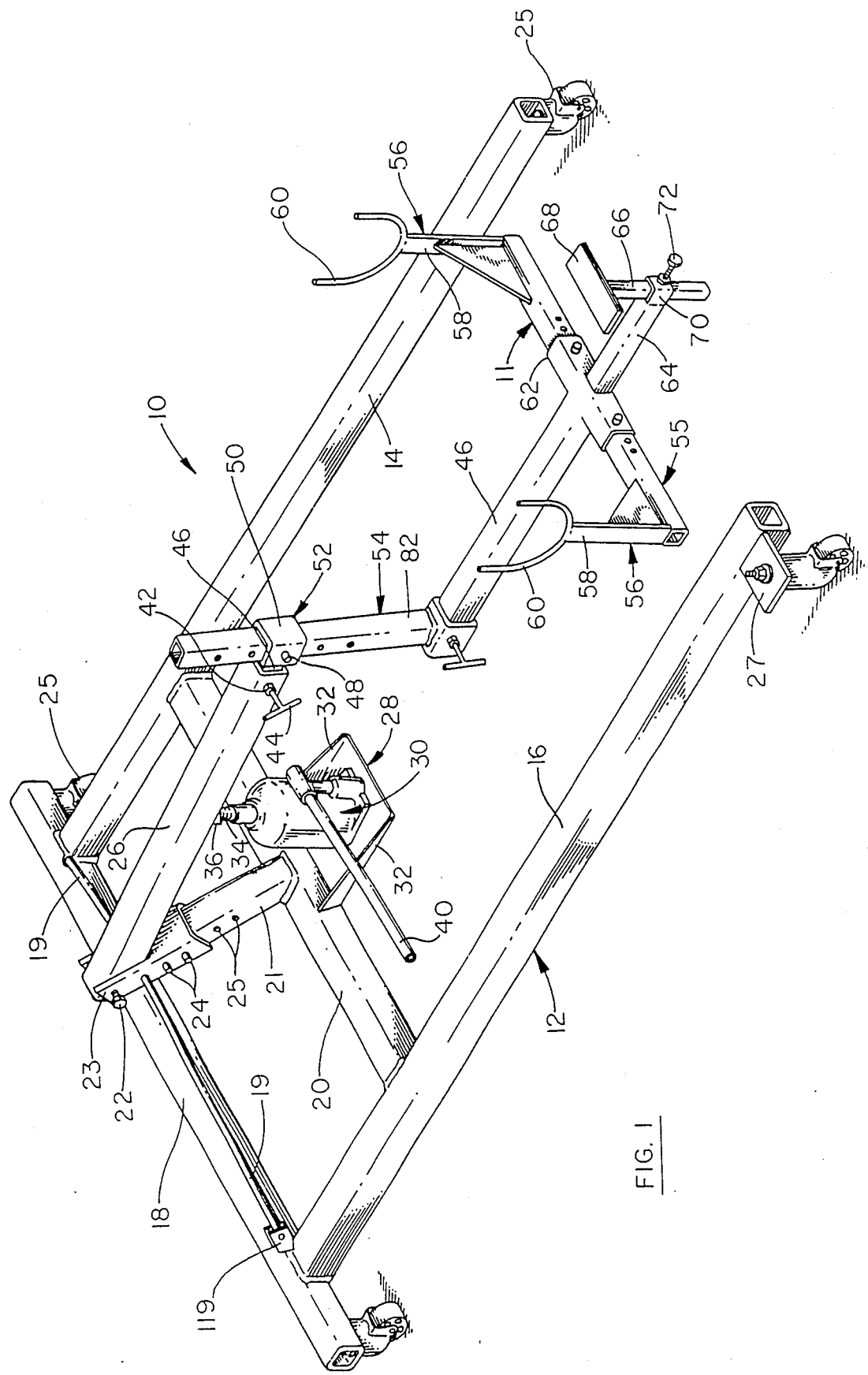
FIG. 1 shows an assembled isometric view of the lift assembly of the present invention, including a differential or axle housing lift head.

Referring to FIG. 1, an assembled isometric view is shown of a preferred embodiment of the lift assembly 10 of the present invention and to which is coupled a lift head 11 used to hoist and remove/install the differential housing/rear axle of a vehicle. In particular, the lift assembly 10 comprises a horizontal, U-shaped support frame 12 which includes right and left longitudinal members 14 and 16 and which are approximately 48 inches long and are spaced away from one another approximately 36 inches via endmounted lateral cross members 18 and 20. Angulating upward from the right and left corners of the rear cross member 18 are a pair of side struts 19 which are secured to a strut 21 having a pivot yoke 23. The strut 21 rises from the center of the forward crossmember 20 and angulates rearward to a point midway between the longitudinal members 14, 16.

The strut members 19 and 21 presently are welded to the cross members 18, 20 at their lower ends and to the yoke 23 at their upper ends and thereby establish the vertical height of the overall assembly 10. The lower ends of the struts 19, 21 might however be pivotally mounted as at joint 119 to the frame 12 with the yoke 23 comprising a slide coupled, locking arrangement (as depicted) such that the tilt angle and height of the strut 23 can be varied as required. Such a slide action can be achieved with a pair of linch pins 24 and mating hole pairs 25 in the strut 21 and yoke 23.

Pivotally mounted to the yoke 23 via a latched, hardened pivot pin 22 is a primary longitudinal lift arm 26 which extends horizontally to a point approximately mid-length of the frame 12.

Mounted to each corner of the framework 12 are individual hard rubber or metal, bearing supported casters 25. A variety of types of casters can be used and depending upon the type, either the framework 12 is drilled directly to receive a threaded pedestal extending from the caster 25 interiorly of the frame 12 or alternatively a wing plate 27 is welded to the frame 12 to support the caster 25 as shown for the lower, front caster 25 and wherefrom the caster pedestal is visible. Either type of mounting is acceptable. The casters 25 are also selected to individually support a working load of approximately 300 pounds, or a total load of 1200 pounds, which is sufficient for most applications where the invention is used.

As presently constructed the framework 12 is formed of 2½ inch by 2½ inch square tube stock of 3/16 inch wall thickness. Depending upon the application and economics, however, different sized tube stock and/or tensile strength stock may be used.

Welded to the forward crossmember is a jack receiving platform 28 whereat a hydraulic bottle jack 30 is supported in engagement with the lift arm 26. The lower end of the jack rests on the platform 28 but may be secured thereto with appropriate bolt fasteners. Right and left welded triangular wing members 32 add rigidity to the platform 28. Otherwise, the upper end of the hydraulically controlled jack piston 34 contacts the lower surface of the lift arm 26 within a mating cradle 36, when the jack is properly positioned. The cradle 36 holds the piston 34 to the arm 26. A jack pump handle 40 also normally extends laterally from the lift 10 to facilitate the actual jacking of the lift arm 26; although where space does not permit, the jack 30 and handle 40 may be rotated.

Returning attention to the primary lift arm 26, mounted to its forward end is a welded nut 42 and mating, T-handled threaded bolt 44 which acts in the fashion of a set screw to secure a forwardly extending lift head assembly. Although a rear axle or differential housing support assembly 11 is attached to the arm 26 by way of a pair of intermediate transition arms, a variety of different lift heads may be mounted to the primary lift arm 26 and/or multiple intermediate transition arms. Each lift head accordingly includes a rearwardly extending tubular member 46 which slip mounts in the fore-end of the lift arm 26. The length of the member 46 may be sized to permit a range of adjustment relative to the arm 26 and upon establishing the proper length displacement of the lift head, the T-handeled bolt 44 is tightened to secure the lift head in place.

In lieu of a set screw mounting arrangement, it is to be appreciated a linch pin 48 and slide head coupler 50 might be employed such as in the fashion of the transition arms 52 and 54, which will be described with respect to FIG. 2, but which requires the drilling of each of the mating tubular stub members 46 of each transition arm and/or lift head. In any case, depending upon floor/chassis space availability and the position of the assembly being worked on, the appropriate arm 26 height and length may be established for the lift head.

This is especially important where lift space is at a premium, since the amount of available lift arc may be varied with the adjustment of the exposed height and length to the lift head 26.

For the axle supporting lift head 11 shown, other than the lift arm extension portion 46, a T-mounted member 55 extends laterally to each side of the arm 46 near the forward end. Mounted to the outer ends of the T-member 55 are upright axle yoke assemblies 56 with each assembly 56 including a riser portion 58 and an upper U-shaped portion 60. The yokes 56 may thus be brought to bear about a differential housing during removal/reattachment. Although too the right and left sides of the T-member 55 are currently constructed at a fixed length, it is to be appreciated that like the strut 21 and yoke 23, a pinned slide connection 62 may be used as shown. Thus, the positioning of the yokes 60 relative to one another might be varied as necessary relative to the differential housing.

Extending from the forward end of the member 46 is an extension portion 64 and vertical riser 66 and to an upper surface of which is secured a support plate 68. The height of the plate 68 is adjustable relative to the extension portion 64 via a slip coupler end 70 and set screw 72. The 2 mounting position of the plate member 68 might thus be adjusted as necessary to provide additional support for the workpiece. Alternatively too, a third yoke member 60 might be mounted to the extension arm 64 or for that matter any number of other differently shaped supports or clamp brackets or clamp or chain fasteners or bolts to secure the axle housing to the lift head 11, some of which will be described hereinafter.

Figure 2:
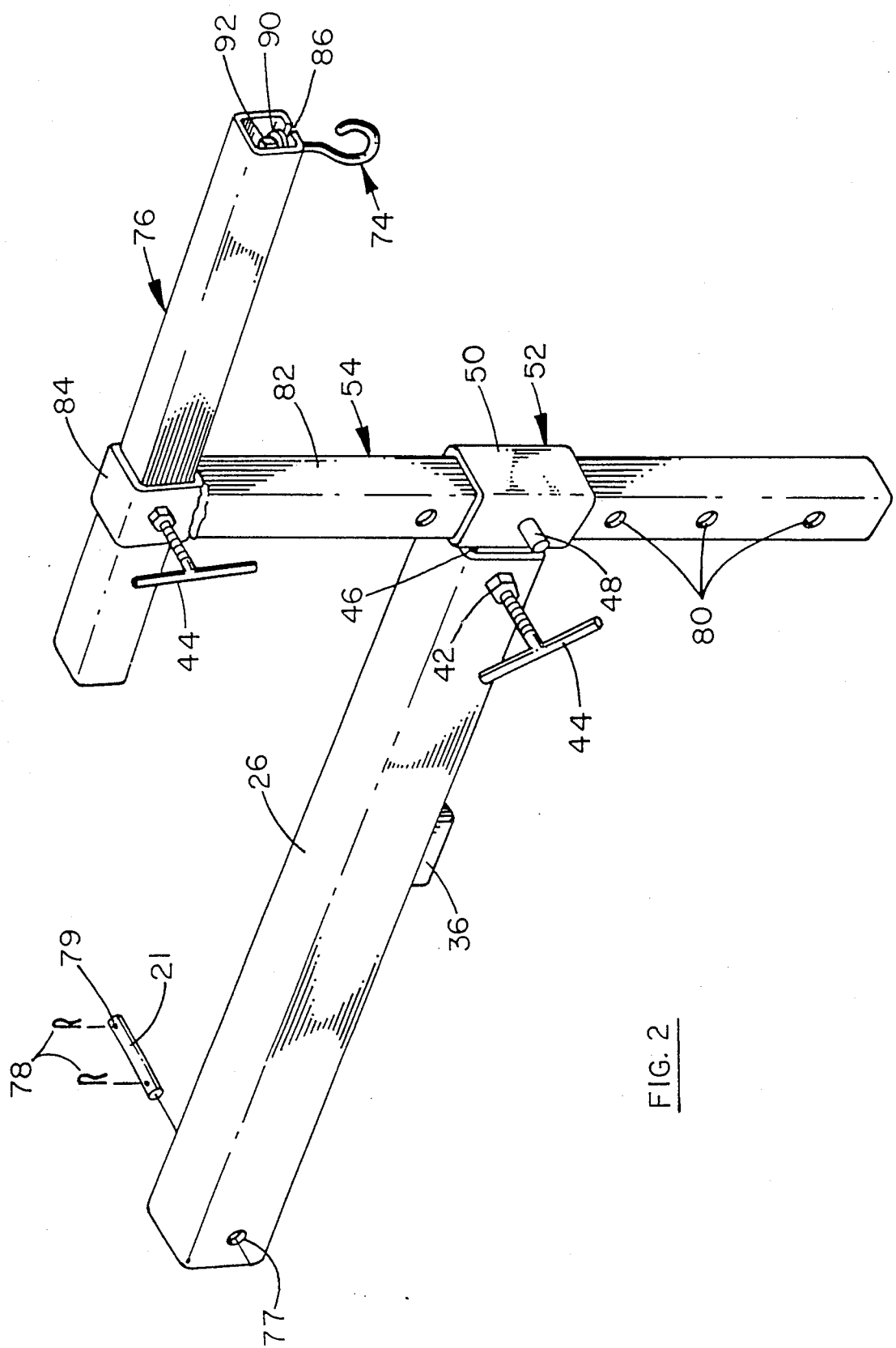
FIG. 2 shows an isometric view of the primary lift arm of FIG. 1 and a hooked lift head.

Turning attention next to FIG. 2, a detailed view is shown of the primary lift arm 26 removed from the lift 10 and relative to which the transition arm 54 is inverted and supports a hooked lift head 74 secured to the forwardmost end of a transition arm 76. More apparent from this view also are the jack head 36, the T-bolt 44 and aperture 77 for the pivot pin 21 pin 21 is secured to the lift 10 via a pair of end clips 78 which mount in provided holes 79.

For this arrangement, the first horizontal transition arm 52 includes a linch pin 48 and end mounted, vertical slide coupler 50 which slideably mate with the outer end of arm 26. The end coupler section 50 is mounted at right angles to the horizontally extending arm portion 78 contained within the primary lift arm 26 to form a vertical slip collar. Let through the sides of the coupler 50, which comprises a piece of stock of the same dimensions as the lift arm 26, and riser 82 are bored holes 80. The linch pin 48 which is passed through an appropriately selected pair of holes 80 in the vertical riser 82 of the transition arm 54 and which may be mounted to position its end coupler 84, either above or below the arm 26 (reference FIGS. 1 and 2). Welded to a forward end of the riser 82 is another slip coupler 84 which includes a T-handled, set screw acting, bolt/nut 44, 42.

Secured from the end coupler 84 is a third lift head containing transition arm 76. Fitted to a slot 86 in the lower surface of the extreme end of the third transition arm 76 is the mentioned hook-type lift head 74. Specifically, an upper threaded end of the lift head assembly 74 is slideably secured within a longitudinal slot 86. Flat washers 90 and nuts 92 mounted above and below the slot 86 to the hook member 84 define a shouldered slide stem by which the head 74 is positioned and locked to the transition arm 76.

Once secured, chains or the like may be supported from the hooked lift head 74 and about an appropriate subassembly which is to be lifted. Thus, with the appropriate selection and mounting orientation of transition arms 52, 54 and 76 to one another, the hooked-lift head 74 may be brought to bear above a specific vehicle subassembly and a vertical jacking or lifting force may be appropriately applied. The primary requirement is that the space between the chassis and the top of the subassembly or between the floor and the bottom of the subassembly must be sufficient to accommodate the necessary lift heights. Generally however a lift height of 3 to 12 inches will suffice for most jobs.

Figure 3:
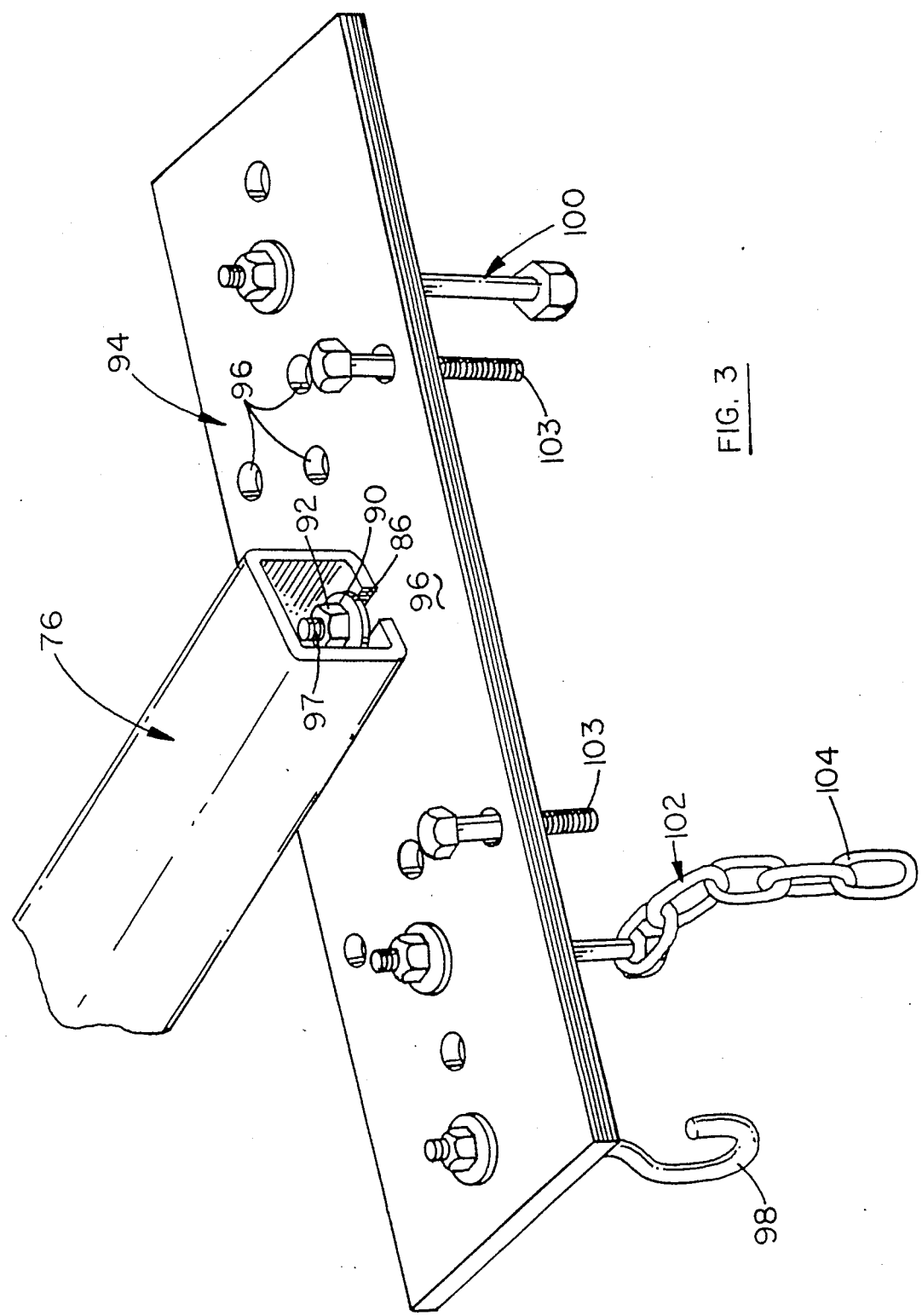
FIG. 3 shows an isometric view of a multi-apertured, plate-type lift head.

FIG. 3 shows another lift head assembly 94 comprising a plate member 96 and a shouldered slide stem 97 having upper and lower pairs of washers/nuts 90, 92 (only one pair of which are shown), which stem 98 mounts within the slot 86 of the transition arm 76. Thus, the plate member lift head 92, as well as the hooked lift head 74, may be adjusted to and fro along the transition arm 76, just as the transition arm 74 may be adjusted relative to the coupler 84 of the vertical transition arm 54, which may also be adjusted relative to the primary arm 26.

Suspended through one of the holes 96 in the plate member 92 is a hook assembly 98, while an inverted bolt 100, a pair of upright bolts 101 and a bolt/chain assembly 102 extend through others of the holes 96. The holes 96 are patterned in the plate 92 to provide a variety of alternative mounting positions relative to the slide stem 97 which similarly may be mounted in any of the holes 96, as necessary. The chains 104 may also be suspended from the hooks 98 and/or one or more of the bolts 100, 101 may be mounted directly to the vehicle subassembly.

Figure 4:
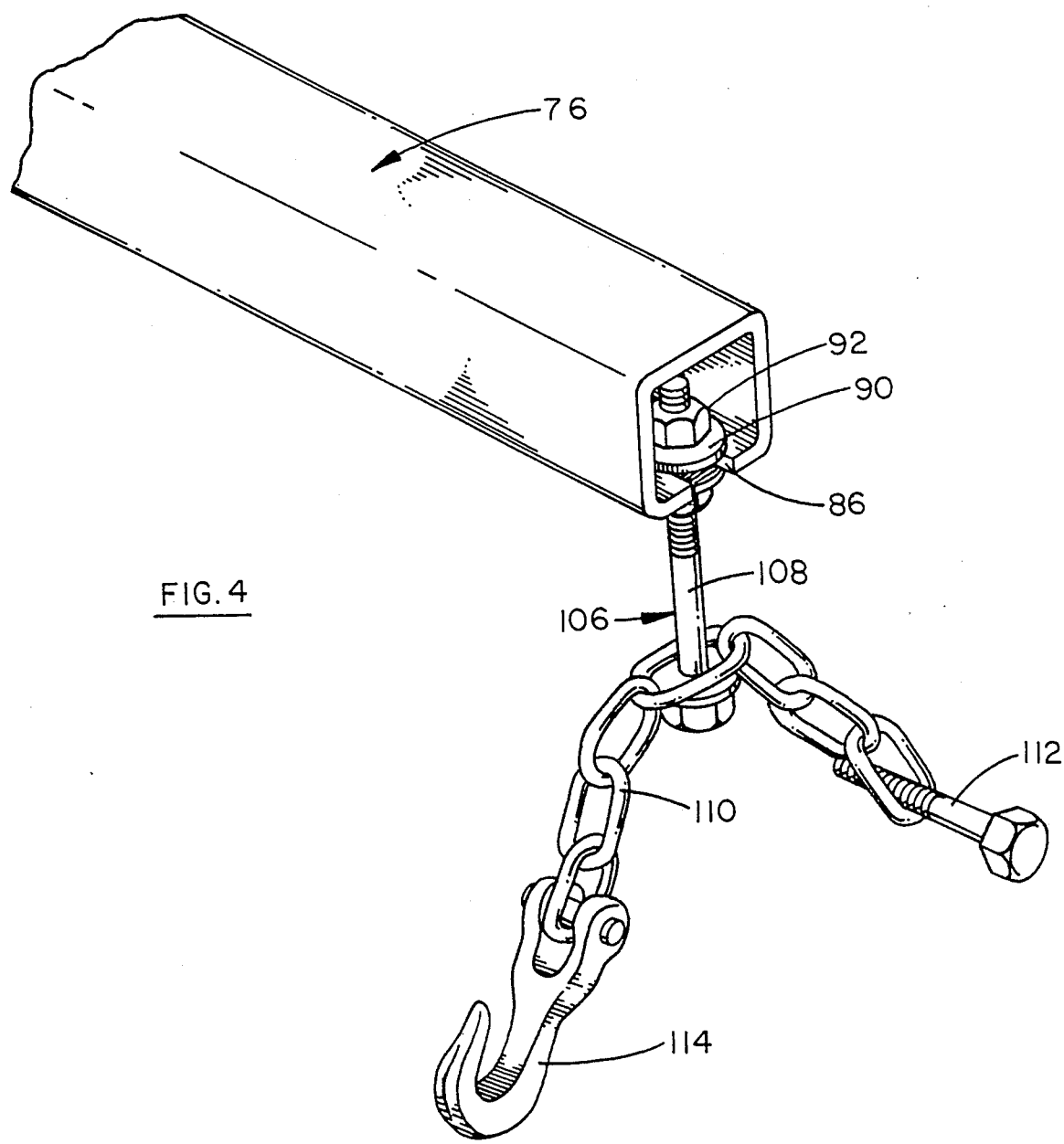
FIG. 4 shows an isometric view of a chain-link lift head.

FIG. 4 depicts another lift head assembly 106 which comprises a shouldered slide stem or bolt 108 having upper and lower pairs of washers/nuts 90, 92. Secured to the bolt 108 is a length of chain 110 and to the end loops of which are alternatively depicted a bolt/nut 112 and to the opposite end a shackled hook 114. Depending upon the workpiece, the length of the chain 110 may be adjusted and/or multiple bolts/nuts 112 or hooks 114 may be positioned along the chain 110.

Figure 5:
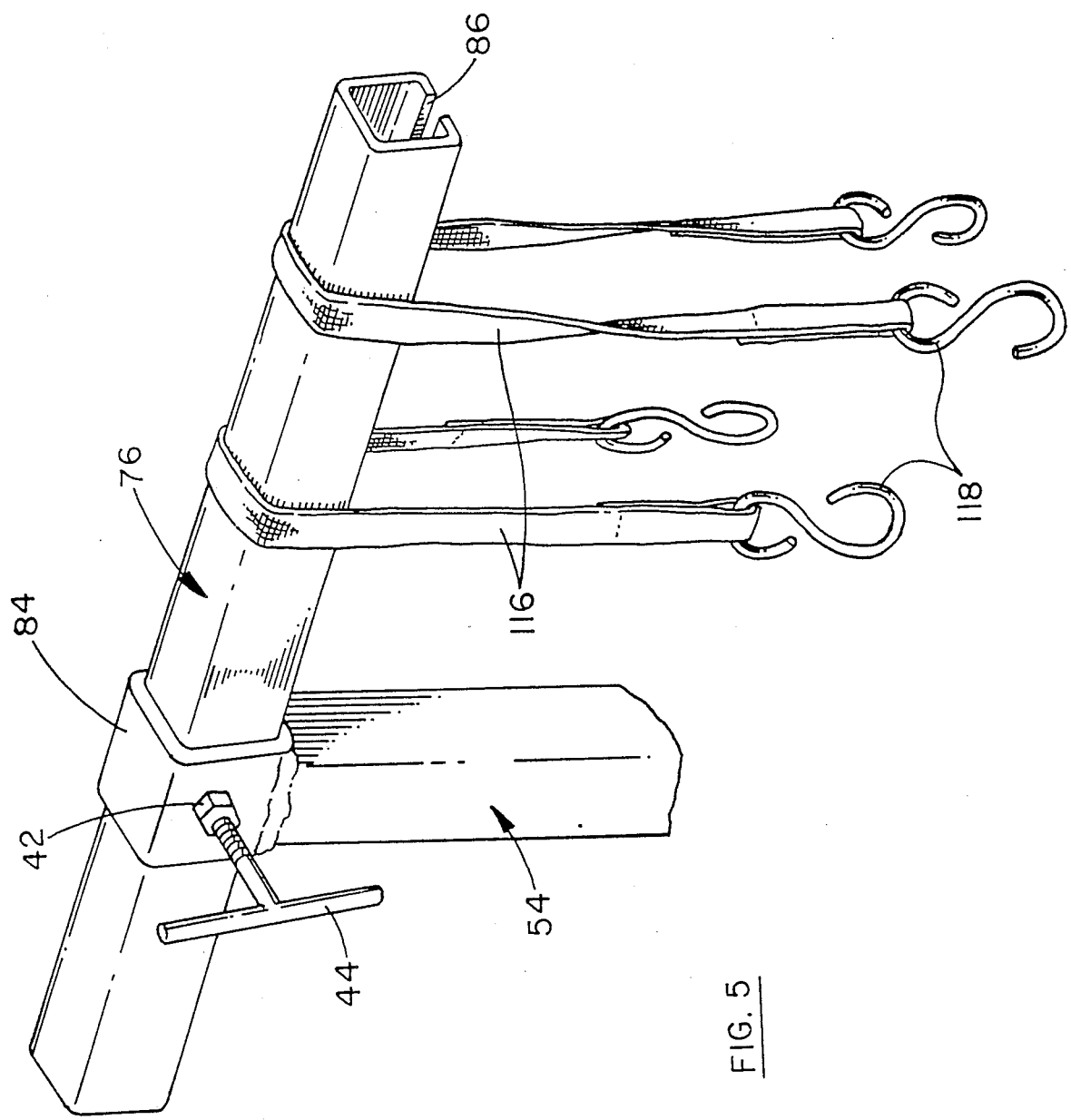
FIG. 5 shows an isometric view of a strap compatible lift head.

Attention is lastly directed to FIG. 5 and wherein yet another lift head embodiment having a pair of strap fasteners 116 with end hooks 118 draped about the extreme end of the lift arm 76 are shown. Such an arrangement finds particular application where it is necessary to project the extension arm 76 through an available vehicle opening. One or more strap fasteners 116 looped about the arm 74 are then wrapped about the arm 76 and any particular vehicle subassembly to secure one to the other during removal/insertion. Applicant has found this strap arrangement to be particularly useful when removing motorcycle engines from a confined frame spacing, which task is not otherwise accommodated with other available equipment or conventional "cherry picker" lifts.

While the forgoing invention has been described with respect to its presently preferred and various alternative embodiments, it is to be appreciated that still other embodiments and modifications might suggest themselves to those of skill in the art. Accordingly, it is contemplated that the following claims should be interpreted to include all those equivalent embodiments within the spirit and scope thereof.

What is claimed is:

1. A low-profile lift assembly comprising:
(a) a ground supported framework including a plurality of frame members coupled to one another and from ones of which frame members pivotally extend a plurality of strut members having an opposite end pivotally coupled to an overlying yoke member, said yoke member slidably mounted along a riser member acutely extending from said framework and including means for securing said yoke member to said riser member at a desired mounting position whereby the relative height of said primary lift arm to the ground may be raised without varying the mounting position of said hydraulic lift means;
(b) hydraulic lift means mounted to said frame work;
(c) an elongated primary lift arm pivotally mounted at one end to said yoke member and including means along its length securing an upper end of said lift means thereto;
(d) a plurality of transition arms slidably mountable to one another and to the outer end of said primary lift arm, wherein pairs of said transition arms mate with one another and include means for length adjustably securing one to the other and wherein an outermost one of said transition arms includes a longitudinal slotted channel; and
(e) a lift head having a shouldered slide stem mountable along said slotted channel and including means for securing a workpiece to said lift arm, whereby the workpiece may be raised from above or lifted from below.

2. Apparatus as set forth in claim 1 wherein said framework includes a hydraulic jack-receiving platform whereupon a hydraulic, hand-operated jack is mountable.

3. Apparatus as set forth in claim 1 including a plurality of wheeled casters mounted to said framework.

4. Apparatus as set forth in claim 1 wherein said plurality of strut members comprise mating length-adjustable portions which fixedly mount to one another.

5. Apparatus as set forth in claim 1 wherein at least one of said transition arms includes a coupler member slideably mounting about an extension portion of another of said transition arms and wherein said coupler member includes a set screw threadably extensible from said coupler to restrainably impinge on said extension portion.

6. Apparatus as set forth in claim 1 includes a through aperture aligning with at least one through aperture in an extension portion of another of said transition arms and a linchpin mounting through said aligned apertures.

7. A low-profile lift assembly comprising:
(a) a ground supported framework including a plurality of frame members coupled to one an other and from ones of which frame members angularly extend a plurality of strut members having an opposite end coupled to an overlying yoke member;
(b) a hand-operated hydraulic jack supported on a platform secured to said framework;
(c) an elongated primary tubular lift arm pivotally mounted at one end to said yoke member and including a cupped member along a lower arm surface restraining an upper end of said jack thereto;
(d) a plurality of transition arms slideably mountable to one another and to the outer end of said primary lift arm, wherein ones of said transition arms include end mounted slide collars receiving an elongated extension portion of another of said transition arms and wherein ones of said slide collars include a set screw mounting to the extension portion of another transition arm and others of said slide collars include at least one aperture aligning with a through aperture in the extension portion of another transition arm and wherein an outermost one of said transition arms includes a longitudinal slotted channel;
(e) a lift head having a shouldered slide stem mountable along said slotted channel and including means securing a workpiece to said lift arm, whereby the workpiece may be raised from above or lifted from below.

8. A low-profile lift assembly comprising:
(a) a ground supported framework including a plurality of frame members coupled to one another and from ones of which frame members vertically extend a plurality of strut members having an opposite end coupled to an overlying yoke member;
(b) hydraulic lift means mounted to said frame work;
(c) an elongated primary tubular lift arm pivotally mounted at one end to said yoke member and including means along its length securing an upper end of said lift means thereto;
(d) a plurality of transition arms slidably mountable to one another and to the outer end of said primary lift arms, wherein pairs of said transition arms mate with one another and include means for length adjustably securing one to the other and wherein an outermost one of said transition arms includes a longitudinal slotted channel; and
(e) a lift head comprising:
 (i) a tubular first member;
 (ii) first and second lateral members extending to the sides of said first member and each supporting a vertical riser member whereupon a U-shaped support is secured; and
 (iii) a second tubular member extending from said first member and including a vertical riser portion mounted to a forward end.

9. A low-profile lift assembly comprising:
(a) a ground supported framework including a plurality of frame members coupled to one another and from ones of which frame members vertically extend a plurality of strut members having an opposite end coupled to an overlying yoke member;
(b) hydraulic lift means mounted to said frame work;
(c) an elongated primary tubular lift arm pivotally mounted at one end to said yoke member and including means along its length securing an upper end of said lift means thereto;
(d) a plurality of transition arms slidably mountable to one another and to the outer end of said primary lift arm, wherein pairs of said transition arms mate with one another and include means for length adjustably securing one to the other and wherein an outermost one of said transition arms includes a longitudinal slotted channel; and
(e) a lift head comprising
 (i) a stem member slidably mounted to said slot between shoulder portions of wider dimensions than said slot; and
 (ii) a plate member having a plurality of apertures therethrough secured to said stem.

10. A low-profile lift assembly comprising:
(a) a ground supported framework including a plurality of frame members coupled to one another and from ones of which frame members vertically extend a plurality of strut members having an opposite end coupled to an overlying yoke member;
(b) hydraulic lift means mounted to said frame work;
(c) an elongated primary tubular lift arm pivotally mounted at one end to said yoke member and including means along its length securing an upper end of said lift means thereto;
(d) a plurality of transition arms slidably mountable to one another and to the outer end of said primary lift arm, wherein pairs of said transition arms mate with one an other and include means for length adjustably securing one to the other and wherein an outermost one of said transition arms includes a longitudinal slotted channel; and
(e) a lift head comprising:
  (i) a shouldered stem member slidably mounted to said slot between shoulder portions of wider dimensions than said slot;
  (ii) a chain secured along said stem; and
  (iii) means for coupling the ends of said chain to the workpiece.

11. A low-profile lift assembly comprising:
(a) a ground supported framework including a plurality of frame members coupled to one another and from ones of which frame members vertically extend a plurality of strut members having an opposite end coupled to an overlying yoke member;
(b) hydraulic lift means mounted to said frame work;
(c) an elongated primary tubular lift arm pivotally mounted at one end to said yoke member and including means along its length securing an upper end of said lift means thereto;
(d) a plurality of transition arms slidably mountable to one another and to the outer end of said primary lift arm, wherein pairs of said transition arms mate with one another and include means for length adjustably securing one to the other and wherein an outermost one of said transition arms includes a longitudinal slotted channel; and
(e) a lift head having a shouldered slide stem including a body portion along which is slidably mounted a pair of shoulder members, said shoulder members mounting on opposite sides of said slot, and means for securing each of said shoulder members at predetermined position along said body portion.

12. Apparatus as set forth in claim 11 wherein said threaded body portion extends to an arcuate outer end.

* * * * *